United States Patent Office 3,720,803
Patented Mar. 13, 1973

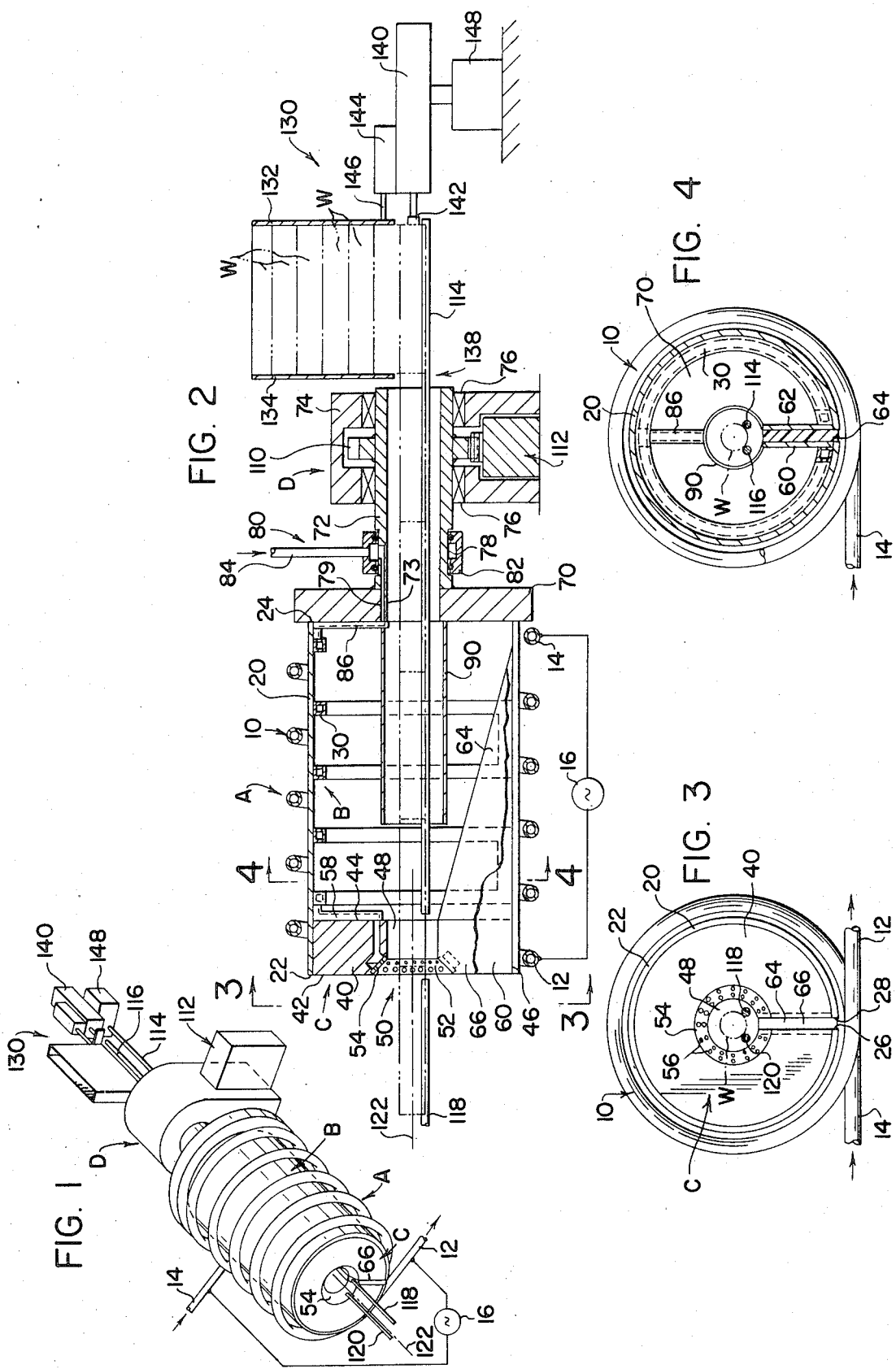

3,720,803
METHOD AND APPARATUS FOR INDUCTIVELY
HEAT TREATING ELONGATED WORKPIECES
John C. Lewis, Hamilton, Wentworth, Ontario, Canada,
assignor to Park-Ohio Industries, Inc., Cleveland, Ohio
Filed June 2, 1972, Ser. No. 259,087
Int. Cl. H05b 5/08
U.S. Cl. 219—10.69
24 Claims

ABSTRACT OF THE DISCLOSURE

A method and apparatus for inductively heating and quenching elongated workpieces wherein the workpieces are longitudinally conveyed along a workpiece pass. The induction heating inductor is positioned within an elongated generally cylindrical transformer secondary winding which is positioned to surround the workpiece pass. During energization of the transformer for resultant energization of the inductor, at least the transformer secondary winding and inductor are continuously rotated about their longitudinal axes, while the workpieces are conveyed along the workpiece pass, to assure even heating of the workpieces. Means are provided adjacent the transformer secondary winding for cooling the secondary and adjacent the inductor for quenching the workpiece immediately following heating.

---

This application pertains to the art of induction heating and more particularly to induction heat treating.

The invention is particularly applicable to induction heat treating of an elongated workpiece such as a shock absorber shaft and will be described with particular reference thereto; however, it will be appreciated that the invention has broader applications and may be used in other instances wherein it is desired to inductively heat treat elongated workpieces to provide substantially even heating of the cylindrical surface to be heated.

Heretofore, in the induction heat treating of elongated shaft-like workpieces and in using a scanning type of heating, it had been common practice to place the inductor and associated transformer in a stationary position while passing the workpieces in an inductive heating coupling relationship therewith. Most of these scanning prior method and apparatus, however, required that the workpieces themselves be rotated during heat treating in order to assure substantially even treatment around the diameter of the shaft. The fact that the workpieces had to be rotated caused difficulty in the handling thereof and further required a substantial amount of costly and complex workpiece handling equipment. Therefore, it had been considered advantageous to be able to rotate the induction heating inductor rather than the workpieces, at least during the heating operation. However, prior attempts at providing inductors which were rotated as the workpieces were passed in an inductive coupling relationship therewith have presented many difficulties which have made their use undesirable. In induction heat treating of elongated billets, it had been common practice to pass the billets through an elongated multi-turn inductor in order that the entire billet would be simultaneously heated. This type of heating, however, had the disadvantages of requiring a substantial amount of space for the heating apparatus, requiring a long heating time and requiring a large transformer.

The present invention contemplates a new and improved method and apparatus which overcomes all of the above referred problems and others and provides a new method and apparatus for inductively heat treating elongated workpieces which is simple, economical to employ, provides even workpiece heating without rotating the workpiece and is readily adaptable for use with any number of sizes and configurations of elongated workpieces.

In accordance with the present invention, there is provided an induction heat treating apparatus particularly adapted for use in inductively heating an elongated workpiece. The apparatus includes an elongated multi-turn transformer primary winding having a first longitudinal axis and a first diameter which defines a transformer secondary receiving zone. An elongated, generally cylindrical open ended thin sheet transformer secondary winding which has a second longitudinal axis and a second diameter less than the first diameter is disposed generally coaxially within the primary winding for a magnetic coupling relationship therewith. Means adjacent one end of the secondary winding are provided for receiving the workpiece and means are provided within the secondary winding and in an electrically conductive relationship therewith for inductively heating the workpiece. The apparatus also includes means for moving the workpiece at least from the one end through the secondary winding to the other end along a workpiece pass and means for selectively rotating at least the secondary winding and heating means.

In accordance with another aspect of the present invention, the apparatus further includes means adjacent the heating means for quenching the workpiece immediately following heating.

In accordance with still another aspect of the present invention, means are provided for cooling at least the transformer secondary winding during apparatus operation.

In accordance with still another aspect of the present invention, the apparatus is mounted by a cantilever mounting means.

In accordance with yet another aspect of the present invention, there is provided a method of inductively heat treating an elongated workpiece. The method comprises the steps of:

(a) Providing a workpiece pass longitudinally through an elongated transformer including coaxial primary and secondary windings;

(b) Providing an induction heating conductor within the transformer in an electrical conductive relationship with the secondary winding;

(c) Energizing the transformer with high frequency electrical current;

(d) Continuously rotating at least the secondary winding of the transformer and the induction heating conductor about the longitudinal axis; and, (e) Passing the workpiece longitudinally along the workpiece pass and through the conductor in an inductive coupling relationship therewith.

The principal object of the present invention is the provision of a method and apparatus for inductively heat treating an elongated workpiece wherein the transformer secondary and induction heating conductor are rotated to provide even workpiece heating.

Another object of the present invention is the provision of a method and apparatus for inductively heat treating an elongated workpiece which are simple in design.

Another object of the present invention is the provision of a method and apparatus for inductively heat treating an elongated workpiece which are economical to employ.

Still another object of the present invention is the provision of a method and apparatus for inductively heat treating an elongated workpiece which are readily adaptable to use with a variety of different workpiece sizes and cross sectional configurations.

Still a further object of the present invention is the provision of a method and apparatus for inductively heat treating an elongated workpiece which permits continuous operation for obtaining maximum production outputs.

The invention may take physical form in certain parts and arrangements of parts, a preferred embodiment of which will be described in detail in this specification and illustrated in the accompanying drawings which form a part hereof and wherein:

FIG. 1 is a perspective view of the induction heating apparatus of the subject invention;

FIG. 2 is a cross sectional view of the apparatus taken along line 2—2 of FIG. 1;

FIG. 3 is an end view in the direction of the inductor portion of the apparatus; and, FIG. 4 is a cross sectional view of the apparatus taken along line 4—4 of FIG. 1.

Referring now to the drawings wherein the showings are for purposes of illustrating the preferred embodiment of the invention only and not for purposes of limiting same, the figures show an induction heating apparatus generally comprised of a transformer primary winding or portion A, a transformer secondary winding or portion B, an inductor portion C and a drive portion D.

More specifically, transformer primary portion A is comprised of an elongated continuous multi-turn coil 10 defining a generally cylindrical secondary winding receiving zone. Coil 10 includes end points 12, 14 connected to a high frequency electrical generator generally designated 16 of a type known in the induction heating art. Further, coil 10 is advantageously hollow in order that a continuous flow of cooling fluid may be introduced to and passed therethrough at end points 12, 14 to effect cooling of the coil as is also known in the art.

Transformer secondary portion B is comprised of a thin sheet open ended generally cylindrical member 20 constructed from, for example, copper to have a diameter less than the diameter of the area secondary receiving zone in order that it may be received in a magnetic coupling relationship with coil 10. Thin sheet member includes end edges 22, 24 and spaced apart longitudinal edges 26, 28. A continuous hollow cooling coil 30 is affixed to the inside surface of secondary by, for example, brazing in order to provide a cooling medium for the secondary as will hereinafter become apparent. Cooling coil 30 extends substantially along the length of the secondary in a generally serpentine configuration. Coil 30 does not extend across the gap between longitudinal edges 26, 28.

Disposed to be closely received adjacent end edges 22 of member 20 is inductor portion C which is comprised of a generally circular block conductor 40 having a front face 42, a rear face 44 and a peripheral edge surface 46. It will be appreciated, however, that inductor portion C could be located at other positions in the secondary winding between end edges 22, 24. In the preferred embodiment of the invention, faces 42, 44 are dimensioned so that peripheral edge surface 46 is closely received against the inside surface of member 20. It is entirely possible to employ other arrangements or designs for the inductor portion wherein edge surface 46 is spaced apart from the inside surface of member 20 without departing from the scope of the present invention. Generally centrally located in conductor 40 is a recess 48 which extends therethrough to define a workpiece heating pass. The heating pass may be of any particular dimension in order to insure an efficient inductive coupling relationship with the particular workpieces to be heated. Disposed in front face 42 of conductor 40 is a quench zone 50 which is generally in the shape of a frustrum. Received in zone 50 and establishing a fluid flow gap 52 therein is a quench plate 54 which includes a plurality of perforations 56 to permit fluid flow escape therefrom for quenching the heated workpieces as will hereinafter be described in more detail. Conveniently interconnecting fluid flow gap 52 and cooling coil 30 is a quench fluid supply line 58. A pair of generally triangular current conductors 60, 62 known in the art as fishtails extend in a spaced apart relationship with each other along longitudinal edges 26, 28 and in contact with rear face 44 of block conductor 40. These fishtail members assist in conducting current flow from the transformer secondary portion to the block conductor itself in order to increase the efficiency of the induction heating operation as is known in the art. Disposed between fishtails 60, 62 is an insulation material 64 which prevents short circuiting between the fishtails or across slot 66 in conductor 40 during apparatus operation. Conductor 40 includes a slot 66 extending radially outward from recess 48 to peripheral edge surface 46. Slot 66 prevents short circuiting of the apparatus during operation as is known and is in general alignment with edges 26, 28 with one of fishtails 60, 62 disposed on each side thereof. It will also be appreciated that conductor 40 could be hollow in order that the cooling fluid may pass therethrough and that quench zone 50 could be integral with the conductor.

End edge 24 of the member 20 is affixed to a base plate 70, constructed from an electrically insulating material, by any convenient means and an elongated hollow mounting and driving shaft 72 is, in turn, rigidly affixed to base plate 70 to extend outwardly therefrom. I should be here noted that an access opening 73 is also included in base plate 70 and that recess 48, access opening 73 and elongated hollow mounting and driving shaft 72 are disposed in a generally coaxial relationship with thin sheet secondary member 20 so as to facilitate the passage of workpieces therethrough as will hereinafter be more fully described. It should also be noted that the cross sectional dimensions of the hollow portion of shaft 72 and access opening 73 are sufficient to permit workpieces of various sizes to be passed therethrough without interference.

Mounting shaft 72 is journaled in an apparatus mounting frame generally designated 74 for providing a cantilever mounting for the apparatus so that it is disposed in a generally horizontal position for operation. It is entirely possible, however, to position the apparatus in a generally vertical position for operation. Bearing members generally designated 76 are disposed between frame 74 and shaft 72 as is conventional for similar shaft-frame installations. As frame 7 and bearing member 76 may be of several types, and as they do not form a specific part of the present invention, they are not more fully shown and described. Mounting shaft 72 includes a portion 78 between base plate 70 and that portion of the shaft received in communication with frame 74 which has a fluid supply assembly generally designated 80 received thereover. This supply assembly is comprised of a bracket 82 having connected therewith a fluid flow supply line 84. Bracket 82 includes seals (not shown) in order to permit the bracket to remain stationary as shaft 72, i.e., portion 78, is rotated therein. Portion 78 also includes a fluid flow passage 79 therein for conveying fluid received through fluid supply line 84 and bracket 82 into and through base plate 70. As this type of passage is rather conventional, it is not shown in the drawings in detail. Cooling and quenching fluid is supplied from passage 79 to cooling coil 30 by a fluid supply line 86 which extends therebetween. Affixed to base plate 70 to extend outwardly therefrom in a direction opposite that of shaft 72 is an elongated hollow, workpiece support tube 90 which is provided to assist in the movement of the workpieces through the apparatus. Tube 90 is removable from its position on base plate 70 for replacement by other tubes 90 to accommodate workpieces of different sizes.

Drive portion D is disposed adjacent the end of shaft 72 in operative communication therewith. In the preferred embodiment of the invention, a drive gear 110 is rigidly received about shaft 72 so as to extend circumferentially therearound. A drive means generally designated 112, in turn, is positioned for selective driving engagement with gear 110. In the preferred embodiment, the drive means comprises an electric motor and including the necessary gearing and controls to selectively rotationally drive the apparatus at a desired speed. It will be appreciated that other drive means and arrangements could advantageously be employed without departing from the scope and intent of the subject invention.

Extending throug hthe apparatus from a position outside the outermost end of mounting shaft 72 to a position adjacent rear face 44 of conductor 40 is a pair of workpiece supporting and guiding tracks 114, 116. Similarly, and extending from adjacent front face 42 of conductor 40 outwardly therefrom is a second pair of workpiece tracks 118, 120. These tracks are spaced apart and positioned so as to support the plurality of elongated workpieces W as shown in FIG. 1 so that they will travel longitudinally and substantially coaxially through the apparatus and into a desired inductive coupling relationship with the workpiece heating pass defined by recess 48 in conductor 40. Tracks 114, 116, 118 and 120 may be fully adjustable so as to permit any necessary or desired adjustments to properly accommodate various sizes and shapes of other workpieces along a workpiece pass or feed line 122 as defined thereby.

Disposed adjacent the ends of shaft 72 and tracks 114, 116 is a workpiece feeding mechanism generally designated 130. The feeding mechanism includes a magazine defined by at least a forward wall 134 and a rearward wall 136 which are closely spaced to the ends of a plurality of workpieces W. Walls 134, 136 may be conveniently made to be adjustable to each other to accommodate workpieces of varying lengths. At the bottom of magazine 132 is a workpiece escape area 138 which permits a workpiece W to be moved from magazine 132 into the heat treating apparatus along tracks 114, 116. A feed cylinder 140, which may be either pneumatic or hydraulic, is disposed so as to selectively force each workpiece from magazine 132 along tracks 114, 116. The feed cylinder includes a plunger 142 at the outmost part of the cylinder rod to engage each workpiece during feeding. A second fluid cylinder 144 disposed above the feed cylinder includes a cylinder rod 146 which is selectively engageable with workpieces W so as to retain them in the magazine while one of the other workpieces is being forced along tracks 114, 116 by feed cylinder 140. A conventional control box generally shown by numeral 148 is provided to selectively energize cylinders 140, 144 between their retracted and extended conditions. It will be appreciated that other types of working piece feed mechanisms could be employed without departing from the scope or intent of the subject invention.

In operation of the subject apparatus, drive means 112 is first energized so as to rotatably drive, through drive gear 110, transformer secondary portion B and inductor portion C about their common longitudinal axis and workpieces pass 122. During this rotation, transformer primary portion A is energized by means of high frequency electrical generator 16 and a cooling fluid which, in the preferred embodiment, comprises water, is continuously pumped through coil 10 by means not shown. Similarly, a cooling and quenching fluid which, again, comprises water in the preferred embodiment is pumped under pressure through fluid supply line 84 into bracket 82 for metering into continuous hollow cooling coil 30 and quench zone 50.

With energization of the transformer primary portion, a current is induced to flow within thin sheet secondary member 20 as is known and fishtail members 60, 62 permit the circuit to be completed so that the induced current will flow through block inductor 40 as is also conventional. Workpieces W are longitudinally disposed on workpiece tracks 114, 116 adjacent the outermost end of shaft 72 in an end-to-end relationship with each other so that as the shafts are selectively moved along workpiece pass 122 by feed mechanism 130, they will pass through the induction heating pass defined by recess 48 and in an inductive coupling relationship therewith for resultant inductive heating. Feed cylinder 140 is set through controls 148 to move from its retracted position to its extended position at a constant rate and from its extended position to its retracted position at a fast rate in order to provide constant workpiece movement through the apparatus with a minimum of workpiece stoppage time. Further movement of the workpieces through the apparatus causes them to pass onto workpiece tracks 118, 120 in order that they may be removed from the apparatus for storage or for further processing. As an alternative to moving workpieces W through the apparatus by feed mechanism 130, hand feeding could be employed. The automatic feeding, however, assures a constant rate of heating for each workpiece.

During apparatus operation, the fluid supplied to cooling coil 30 by supply line 86 and passing therethrough assists in removing heat generated in the transformer secondary during operation. As workpieces W are moved through the workpiece heating pass, fluid transmitted from cooling coil 30 to quench zone 50 by supply line 58 operates to quench the heated workpieces immediately following heating.

The continuous rotation of the transformer secondary and inductor portions provides even workpiece heating without the necessity for either rotating the workpieces themselves or providing a complex transformer arrangement.

The invention has been described with reference to the preferred embodiment. Obviously, modifications and alterations will occur to others upon the reading and understanding of this specification. It is my intention to include all such modifications and alterations insofar as they come within the scope of the appended claims or the equivalents thereof.

Having thus defined my invention, I now claim:

1. An induction heat treating apparatus particularly adapted for use in heat treating an elongated workpiece, said apparatus comprising:
   an elongated multi-turn transformer primary winding adapted to be connected to a high frequency electrical generator and having a first longitudinal axis and a first diameter, said primary coil defining a generally cylindrical transformer secondary receiving zone;
   an elongated generally cylindrical open ended transformer secondary winding having a second longitudinal axis and a second diameter with said first diameter being greater than said second diameter, said secondary winding being generally coaxially disposed within said primary winding for a magnetic coupling relationship therewith;
   means adjacent one end of said secondary portion for receiving said workpiece;
   means disposed within said secondary winding in an electrically conductive relationship therewith for inductively heating said workpiece;
   means for supporting said workpiece for movement from at least said one end through said secondary winding to said other end along a workpiece pass; and,
   means for selectively rotating at least said secondary winding and said inductive heating means about said second axis.

2. The apparatus as defined in claim 1 further including means for quenching said workpiece, said quenching means being disposed adjacent said heating means.

3. The apparatus as defined in claim 2 wherein induction heating means is disposed adjacent the other end of said secondary winding.

4. The apparatus as defined in claim 3 wherein said induction heating means comprises a conductor member closely received against the and substantially covering said other end, said conductor member including a workpiece heating orifice extending therethrough generally coaxial with said second axis and adapted to permit an inductive heating coupling relationship with said workpiece as it passes therethrough.

5. The apparatus as defined in claim 4 wherein said quenching means is disposed about said heating orifice at the side of said conductor remote from said secondary winding.

6. The apparatus as defined in claim 2 further including means for cooling said secondary winding.

7. The apparatus as defined in claim 6 wherein said secondary winding is a thin sheet winding which includes inner and outer surface walls, said first cooling means comprising a cooling fluid tube affixed to said inner surface to extend generally serpentinely therearound over substantially the entire length thereof.

8. The apparatus as defined in claim 7 wherein said quenching means and said first cooling means are interconnected to each other.

9. The apparatus as defined in claim 8 further including means for supplying a continuous cooling and quenching fluid flow to said cooling means and said quenching means, said supply means being stationarily disposed remote from said apparatus.

10. The apparatus as defined in claim 3 further including means for carrying a current flow generated in said secondary winding to said conductor member.

11. The apparatus as defined in claim 10 wherein said secondary winding includes inner and outer surface walls and a slot area disposed therein to extend from said one end to said other end, said current carrying means comprising a pair of fishtail blocks disposed along each side of said slot area in an electrically conductive relationship with said secondary winding and said conductor member.

12. An induction heat treating apparatus particularly adapted for use in heat treating an elongated workpiece, said apparatus comprising:
an elongated multi-turn transformer primary winding adapted to be connected to a high frequency electrical generator and having a first longitudinal axis and a first diameter, said primary winding defining a generally cylindrical transformer secondary receiving zone;
an elongated generally cylindrical open ends thin sheet transformer secondary winding having a second longitudinal axis and a second diameter with said first diameter being greater than said second diameter, said secondary winding being generally coaxially disposed within said primary portion for a magnetic coupling relationship therewith;
means adjacent one end of said secondary winding rotatably mounting said secondary winding for rotation about said second axis, said mounting means including means for receiving said workpiece;
means adjacent the other end of said secondary winding in an electrically conductive relationship therewith for inductively heating said workpiece;
means for supporting said workpiece for movement along a workpiece pass from at least said receiving means to said heating means;
means in operative communication with said mounting means for selectively rotatably driving at least said secondary winding and said heating means about said second axis.

13. The apparatus as defined in claim 12 wherein said mounting means comprises a shaft extending outwardly from said one end of said secondary winding, said receiving means comprising a hole extending through said shaft generally coaxial with said second axis.

14. The apparatus as defined in claim 13 further including means for quenching said workpiece, said quenching means being disposed adjacent said heating means.

15. The apparatus as defined in claim 14 further including means for cooling at least said secondary winding, said cooling means and said quenching means are interconnected with each other.

16. The apparatus as defined in claim 15 including means communicating with said shaft for supplying cooling and quenching fluid to said cooling and quenching means.

17. An induction heating apparatus for inductively heating a succession of elongated workpieces moving along a given feed line, said apparatus comprising:
affixed multi-turn primary winding generally concentric with said feed line and having a central opening;
a secondaary winding within said opening, generally concentric with said feel line and telescoped within said primary winding;
an inductor connected to said secondary winding and surrounding said feed line; and,
means for rotating said secondary and said inductor in unison as said workpieces and fed along said feed line and through said inductor.

18. The apparatus as defined in claim 17 including means adjacent said inductor and surrounding said feed line for quenching said workpieces as they are passed through said inductor along said feed line.

19. The apparatus as defined in claim 18 further including means for moving said workpieces along said feed line.

20. The apparatus as defined in claim 19 wherein said moving means comprises mechanical moving means.

21. The apparatus as defined in claim 18 further including means for cooling said secondary winding.

22. A method of inductively heat treating an elongated workpiece, said method comprising the steps of:
providing a workpiece pass longitudinally through an elongated transformer including primary and secondary windings having coaxial longitudinal axes;
providing an induction heating conductor within said transformer in an electrically conductive relationship with said secondary winding;
energizing said transformer with high frequency electrical current;
continuously rotating at least said secondary winding and said conductor about said axes; and,
passing said workpiece longitudinally along said pass and through said conductor in an inductive coupling relationship therewith.

23. The method as defined in claim 22 further including the step of quenching said workpiece following said heating step.

24. The method as defined in claim 23 further including the step of cooling at least said secondary portion during said step of energizing.

References Cited
UNITED STATES PATENTS

| | | | |
|---|---|---|---|
| 3,614,366 | 10/1971 | Huchok | 219—10.69 |
| 2,515,874 | 7/1950 | Hoyler et al. | 219—10.79 X |
| 2,942,089 | 6/1960 | Baker et al. | 219—10.69 X |
| 3,535,618 | 10/1970 | Perrins | 336—123 X |

JOSEPH V. TRUHE, Primary Examiner

B. A. REYNOLDS, Assistant Examiner

U.S. Cl. X.R.

219—10.41, 10.79; 266—4 E; 336—123